United States Patent [19]

Harris

[11] Patent Number: 4,524,485

[45] Date of Patent: Jun. 25, 1985

[54] HINGE STRUCTURE WITH CONTROLLED TRANSLATION OF HINGE AXIS

[75] Inventor: Alfred W. Harris, Redmond, Wash.

[73] Assignee: The Boeing Company, Seattle, Wash.

[21] Appl. No.: 498,948

[22] Filed: May 27, 1983

[51] Int. Cl.$^3$ .................................................. E05D 15/06
[52] U.S. Cl. ........................................ 16/364; 16/370; 16/DIG. 36; 49/240; 244/129.4; 267/150; 267/160; 267/162; 403/74
[58] Field of Search ............... 16/85, 277, 280, 288, 16/327, 304, 305, 360, 361, 364, 370, 381, DIG. 36, 281, 282, 289; 244/129.4; 403/74; 220/335, 343; 49/240, 245; 267/150, 160, 162; 188/304

[56] References Cited

U.S. PATENT DOCUMENTS

| | | |
|---|---|---|
| Re. 18,181 | 9/1931 | Stelzer . |
| 503,064 | 8/1893 | Robinson .............................. 16/280 |
| 1,884,981 | 10/1932 | Otto . |
| 1,885,571 | 11/1932 | Wilson . |
| 1,923,787 | 8/1933 | Larsen ............................. 16/364 X |
| 1,945,254 | 1/1934 | Bittner ................................. 244/29 |
| 1,989,291 | 1/1935 | Prewitt ................................. 244/29 |
| 2,066,649 | 1/1937 | Sabins ................................. 244/38 |
| 2,073,350 | 3/1937 | Osborn ............................... 244/38 |
| 2,182,366 | 12/1939 | Van Vliet ............................ 244/38 |
| 2,499,131 | 2/1950 | Coles ................................ 308/176 |
| 2,553,248 | 5/1951 | Graham ............................. 267/150 |
| 2,584,666 | 2/1952 | Bockrath ............................ 244/38 |
| 2,757,886 | 8/1956 | Correa ................................. 244/64 |
| 2,795,967 | 6/1957 | Wahl ................................... 74/531 |
| 3,032,805 | 5/1962 | Skupas et al. ........................ 16/44 |
| 3,050,346 | 8/1962 | Simpson et al. .................... 305/11 |
| 3,128,071 | 4/1964 | Frazer-Nash ......................... 248/1 |
| 3,229,951 | 1/1966 | Quick ............................. 267/150 X |
| 3,247,975 | 4/1966 | Holt et al. ............................ 212/13 |
| 3,292,917 | 12/1966 | Sherburne .............................. 267/1 |
| 3,498,488 | 3/1970 | Wildey et al. ...................... 214/523 |
| 3,561,747 | 2/1971 | Donnelly ............................ 267/161 |
| 3,649,092 | 3/1972 | Coleman ............................. 308/72 |
| 3,759,351 | 9/1973 | Purple ............................ 267/162 X |
| 4,033,644 | 7/1977 | Reneerkens ......................... 308/207 |
| 4,073,697 | 2/1978 | Protzl ................................. 202/254 |
| 4,358,151 | 11/1982 | Wood ............................ 16/364 X |

FOREIGN PATENT DOCUMENTS

343659 7/1920 Fed. Rep. of Germany ...... 220/335

Primary Examiner—Fred A. Silverberg
Attorney, Agent, or Firm—Joan H. Pauly

[57] ABSTRACT

First and second structures are hingedly connected by the engagement of a hinge pin (24) by a hinge knuckle (22). Knuckle (22) is rigidly mounted on the first structure. Pin (24) is attached to a carrier that is slidably mounted on the second structure. A spring, preferably a plurality of stacks of Belleville springs, is positioned between the carrier and the second structure. The slidable mount allows the two structures to move translationally relative to each other to prevent excessive hinge loads. The spring controls such movement and biases the hinge pin, and therefore the hinge axis, into a center position.

39 Claims, 17 Drawing Figures

HINGE STRUCTURE WITH CONTROLLED TRANSLATION OF HINGE AXIS

TECHNICAL FIELD

This invention relates to knuckle hinge structures and, more particularly, to such a structure that is provided with spring means for allowing controlled movement of the hinge axis to prevent excessive hinge loads.

BACKGROUND ART

As is well-known in the art, in large aircraft with heavy wing mounted engines the aerodynamic forces on the outboard engines cause a significant amount of lateral and vertical movement of the outboard engines. This movement of the engines causes considerable undesirable flutter of the wing strut and the wing itself. In order to detune the frequency of the wing, strut and engine combination and to reduce the undesirable loads on the wing, such aircraft have generally been provided with a spring beam between each outboard wing strut and the wing to which it is attached. The spring beam reduces the natural frequency of the engine and the strut without causing unacceptable reduction in the strength of the strut.

The spring beams have been quite successful in protecting the wing structure, but they have also created new problems. One such problem is movement of the strut trailing edge fairing access doors. The bottom portions of these doors are located to maintain them in a closed position, and the top portions of the doors are hinged onto a skirt beam that is rigidly attached to the wing. Therefore, movement of the strut and engine creates a load on the latch mechanisms and hinge mechanisms of the fairing access doors. These loads can lead to failure of the latches, the hinges, or the doors themselves. Failure of the latches could cause the doors to fly open when the aircraft is in flight and thereby endanger the safety of the aircraft. If the latches are strengthened, the load on the hinges is that much greater and it becomes necessary to provide some means to enable the hinges to carry the load and prevent failure of the hinge structure or the access doors themselves.

In the aircraft environment, there are a number of problems associated with the need to strengthen any structure. These problems include a very limited amount of space and a need for minimizing the overall weight of the structure. In addition, if springs are involved, undesirable characteristics such as rebound and relatively low frequency must be avoided. In the particular case of the hinge load discussed above, it is also necessary to carry a very large load with a quite small deflection of the structure experiencing the load.

The following United States patents disclose spring devices for controlling motion of airfoils in aircraft:

U.S. Pat. No. Re. 18,181, granted Sept. 8, 1931, to W. Stelzer;

U.S. Pat. No. 1,885,571, granted Nov. 1, 1932, to B. F. Wilson;

U.S. Pat. No. 1,945,254, granted Jan. 30, 1934, to C. C. Bittner;

U.S. Pat. No. 1,989,291, granted Jan. 29, 1935, to R. H. Prewitt;

U.S. Pat. No. 2,066,649, granted Jan. 5, 1937, to R. C. Sabins;

U.S. Pat. No. 2,073,350, granted Mar. 9, 1937, to R. R. Osborn;

U.S. Pat. No. 2,182,366, granted Dec. 5, 1939, to J. D. Van Vliet;

U.S. Pat. No. 2,584,666, granted Feb. 4, 1952, to G. E. Bockrath; and

U.S. Pat. No. 2,757,886, granted Aug. 7, 1956, to R. E. Correa.

The Wilson and Sabins patents disclose devices for elastically mounting and controlling the movement of wings. Each of these two patents discloses a device in which a piston or plunger is biased into a center position by a pair of coil springs positioned on either side of the piston. In each case, the spring device is placed between the wing and the fuselage of the aircraft.

The following United States patents disclose apparatus in which Belleville springs or similar devices are used to control movement and/or a load:

U.S. Pat. No. 1,884,981, granted Oct. 25, 1932, to F. Otto;

U.S. Pat. No. 2,499,131, granted Feb. 28, 1950, to H. J. Coles;

U.S. Pat. No. 2,795,967, granted June 18, 1957, to L. J. Wahl;

U.S. Pat. No. 3,032,805, granted May 8, 1962, to J. A. Skupas et al;

U.S. Pat. No. 3,050,346, granted Aug. 21, 1962, to F. E. Simpson et al;

U.S. Pat. No. 3,128,071, granted Apr. 7, 1964, to A. G. Frazer-Nash;

U.S. Pat. No. 3,247,975, granted Apr. 26, 1966, to D. E. Holt et al;

U.S. Pat. No. 3,292,917, granted Dec. 20, 1966, to P. C. Sherburne;

U.S. Pat. No. 3,498,488, granted Mar. 3, 1970, to A. J. Wildey et al;

U.S. Pat. No. 3,561,747, granted Feb. 9, 1971, to A. F. Donnelly;

U.S. Pat. No. 3,649,092, granted Mar. 14, 1972, to H. R. Coleman;

U.S. Pat. No. 4,033,644, granted July 5, 1977, to J. Reneerkens; and

U.S. Pat. No. 4,073,697, granted Feb. 14, 1978, to M. Protzl.

Widley et al disclose a log skidder in which pivotal movement of a rear section with respect to a center section in either direction is resisted by a single stack of Belleville springs. The springs are confined in a cylindrical housing that is pivotally mounted on each of said sections.

The above patents and the prior art that is discussed and/or cited therein should be studied for the purpose of putting the present invention into proper perspective relative to the prior art.

DISCLOSURE OF THE INVENTION

A subject of the invention is apparatus for use in a system in which a hinge knuckle is rigidly mounted on a first structure and a hinge pin is carried by a second structure for pivotally engaging the hinge knuckle, said apparatus including means for allowing controlled translational movement of one of said structures relative to the other of said structures to prevent excessive hinge loads. According to a basic aspect of the invention, said means comprises a hinge pin carrier to which the hinge pin is attached, mounting means, and spring means. The mounting means slidably mounts the carrier onto the second structure to allow movement of the carrier relative to the second structure in either direction along a line essentially perpendicular to the longitudinal axis of the hinge pin. The spring means is positioned between a portion of the second structure and a portion of the carrier for controlling said movement of the carrier and for biasing the carrier into a set position. The first structure, hinge knuckle, hinge pin, and carrier move as a unit with respect to the second structure when one of said structures is subjected to a load tending to move it along said line.

According to an aspect of the invention, the spring means comprises a plurality of Belleville springs. Preferably, the spring means comprises at least first and second stacks of Belleville springs. Movement of the carrier in one direction along said line compresses the first but not the second stack, and movement of the carrier in the opposite direction compresses the second but not the first stack. Also preferably, the mounting means comprises a shaft that extends through said first and second stacks of Belleville springs. In the preferred embodiment, the shaft is fixed to the carrier and forms a part of the carrier, and generally opposite end portions of said shaft are slidably mounted on said second structure.

According to another aspect of the invention, portions of the carrier form second and third hinge knuckles and a space therebetween into which the first hinge knuckle projects. These second and third knuckles are attached to opposite end portions of the hinge pin. Preferably, the spring means comprises first, second, third, and fourth stacks of Belleville springs. The first and second stacks are substantially aligned with the second knuckle, and the third and fourth stacks are substantially aligned with the third knuckle. Movement of the carrier in one direction along said line compresses the first and third but not the second and fourth stacks, and movement of the carrier in the opposite direction compresses the second and fouth but not the first and third stacks. Also preferably, the mounting means comprises two parallel shafts, one of which extends through said first and second stacks of Belleville springs and the other of which extends through said third and fourth stacks of Belleville springs. In the preferred embodiment, said one shaft is fixed to said second knuckle, said other shaft is fixed to said third knuckle, generally opposite end portions of each shaft are slidably mounted on said second structure, and said shafts form a part of the carrier.

The relative positioning of the knuckles and the stacks of Belleville springs has two preferred embodiments. The choice between the two embodiments is largely dictated by the space requirements of the particular installation. In the first preferred embodiment, the second knuckle is positioned between the first and second stacks and the third knuckle is positioned between the third and fourth stacks. In the second preferred embodiment, the first and third stacks are positioned adjacent to the second and third knuckles, respectively, and on one side of a spring abutment formed by said portion of the second structure; and said second and fourth stacks are positioned on the opposite side of said abutment and between said abutment and spring abutments carried by said shafts.

Another subject of the invention is apparatus for use in an aircraft in which a first structure is hingedly connected to a second structure by the pivotal attachment of a hinge knuckle to a hinge pin, said hinge knuckle being rigidly attached to said first structure, said apparatus including means for allowing controlled translational movement of one of said structures relative to the other of said structures to prevent excessive hinge loads. According to a basic aspect of the invention, said means comprises a hinge pin carrier to which the hinge pin is attached, mounting means, and spring means. The mounting means slidably mounts the carrier onto the second structure to allow movement of the carrier relative to the second structure in either direction along a line essentially perpendicular to the longitudinal axis of the hinge pin. The spring means is positioned between a portion of the second structure and a portion of the carrier for controlling said movement of the carrier and for biasing the carrier into a set position. The first structure, hinge knuckle, hinge pin, and carrier move as a unit with respect to the second structure when one of said structures is subjected to a load tending to move it along said line.

Still another subject of the invention is means for allowing controlled translational movement for use in an aircraft in which a first structure is hingedly connected to a second structure by the pivotal attachment of a plurality of hinge knuckles to a plurality of spaced apart hinge pins, said hinge knuckles being rigidly attached to said first structure, and said means allowing controlled translational movement of one of said structures relative to the other of said structures to prevent excessive hinge loads. According to a basic aspect of the invention, said means comprises a plurality of hinge pin carriers to each of which one of the hinge pins is attached. Said means also includes mounting means and spring means. The mounting means slidably mounts each carrier onto the second structure to allow movement of the carrier relative to the second structure in either direction along a line essentially perpendicular to the longitudinal axis of the corresponding hinge pin. The spring means is positioned between a portion of the second structure and a portion of each carrier for controlling said movement of the carrier and for biasing the carrier into a set position. The first structure, hinge knuckles, hinge pins, and carriers move as a unit with respect to the second structure when one of said structures is subjected to a load tending to move it along said line. From one end of the hinge connection to its opposite end, adjacent spring means allow increasing amounts of movement. Preferably, each spring means comprises a plurality of Belleville springs and said increasing amounts of movement correspond to increasing numbers of Belleville springs.

Apparatus constructed according to the present invention provides a means for allowing a structure that is hingedly connected to another structure to move with respect to such other structure without causing damage to itself, the other structure, or the hinge connection. In an aircraft environment, it solves the problem discussed above of providing a means for enabling the hinge connections between fairing access doors and wing structure to carry loads experienced by the doors as a result of movement of the associated wing mounted engines.

The preferred embodiment of the spring means, Belleville springs, is particularly well suited to the aircraft environment. Such springs require much less space than other springs of comparable strength and are also relatively lightweight. Belleville springs also have minimal rebound and very high resonance frequencies. In addition, Belleville springs can carry very large loads with small amounts of compression and therefore small amounts of deflection of the structure whose movement they control.

These and other advantages and features will become apparent from detailed description of the best mode for carrying out the invention that follows.

BRIEF DESCRIPTION OF THE DRAWING

In the drawings, like element designations refer to like parts throughout, and.

BEST MODE FOR CARRYING OUT THE INVENTION

The drawings show a hinge structure that is constructed according to the invention and that also constitutes the best mode of the invention currently known to the applicant. The drawings illustrate what is anticipated will be the primary use of the hinge structure of the invention. In the drawings, the preferred embodiment of the hinge structure hingedly connects the strut trailing edge fairing access doors 18, 20 associated with the outboard wing mounted engine 8 of an aircraft 2. The doors 18, 20 are hingedly connected to a skirt beam 16 rigidly attached to the wing 4. The hinge structure is designed to permit controlled vertical deflection or movement of the doors 18, 20 that progressively decreases from the forward ends of the doors 18, 20 to the aft ends.

Figures 1, 2, 3:
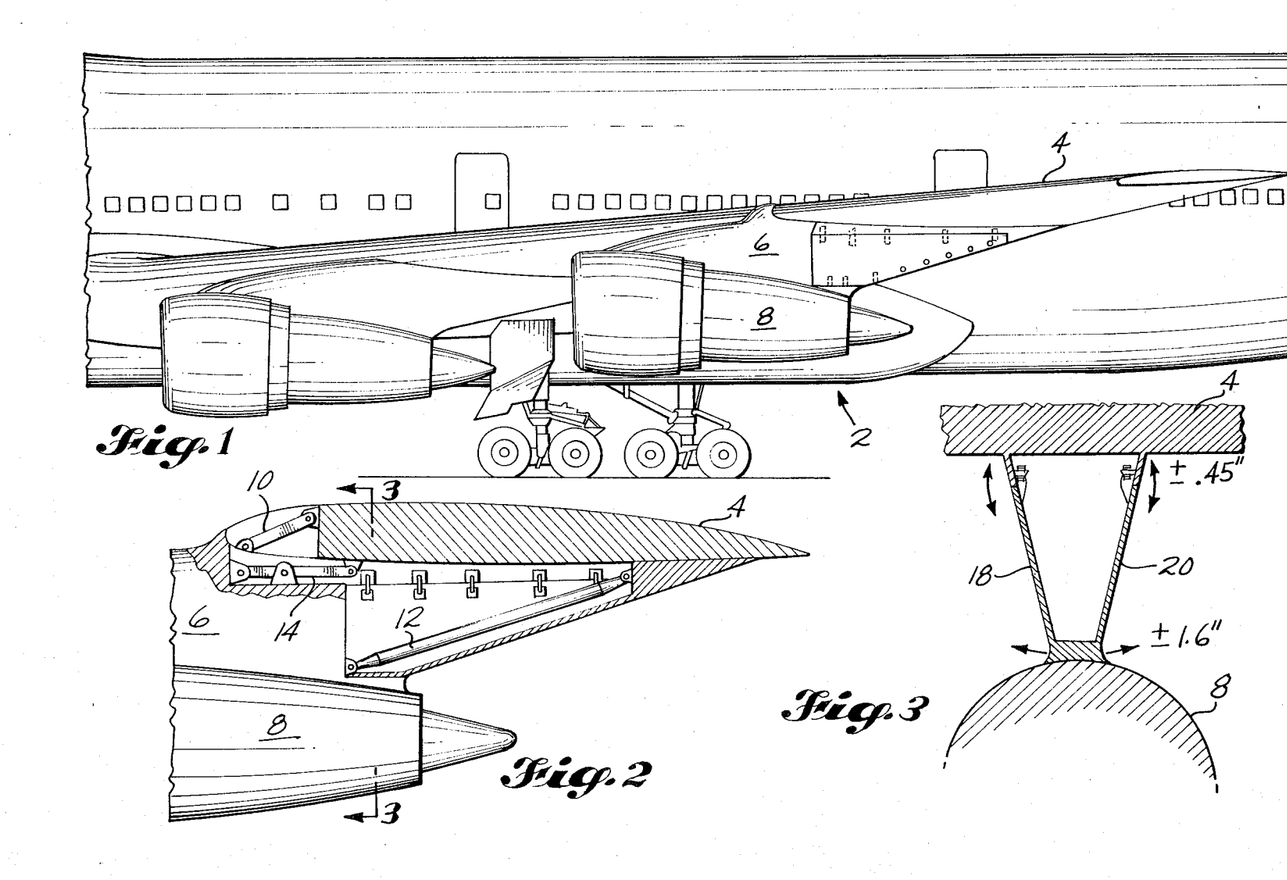
FIG. 1 is an elevational view of a portion of an aircraft into which the preferred embodiment of the invention has been incorporated, with the foreground outboard strut trailing edge fairing access door removed to show the hinge locations and the latch locations.
FIG. 2 is an enlarged fragmentary view of the trailing edge fairing and surrounding structure shown in FIG. 1, with portions shown in section.
FIG. 3 is a simplified sectional view taken along the line 3—3 in FIG. 2, showing the motion of the engine and the access door.

As noted above, the necessity for allowing vertical movement of the hinge axis is created by the spring beam mounting of the outboard engine strut 6. This mounting of the strut 6 is well-known in the art and forms no part of the present invention. Therefore, it will only be very briefly described herein. As is most clearly shown in FIG. 2, the strut 6 is attached to the wing 4 by three beams 10, 12, 14. The upper forward beam 10 and the aft beam 12 are conventional mounting beams. The beam 14 is the spring beam which replaces a substantially rigid connection in mounting arrangements without spring beams. The spring beam 14 permits sufficient lateral and vertical deflection of the strut 6 and engine 8 with respect to the wing 4 to prevent unacceptable flutter of the wing 4. The strut mounting arrangement shown in FIG. 2 is shown for illustrative purposes only in order to illustrate an environment in which movement of a hinge connected structure creates a need to reduce hinge loads. It is of course to be understood that the hinge structure of the invention could be used in conjunction with other arrangements of strut mountings and in entirely different environments in which hinge loads need to be reduced.

FIG. 3 illustrates the movement of the engine and the corresponding movement of the hinge axis at the forwardmost hinge station. As can be seen in FIG. 3, there is a vertical component of the hinge movement and a rotational component about the hinge axis. The vertical component of the movement is the one with which the present invention is concerned. The structure of the hinge fittings or knuckles 22, 22' carried by the access doors 18, 20 includes a spherical bearing means that allows a relatively small amount of rocking or pivoting of the knuckle 22, 22' about its hinge pin 24. This bearing arrangement is conventional and prevents racking and binding of the hinge attachment.

Figures 4, 5:
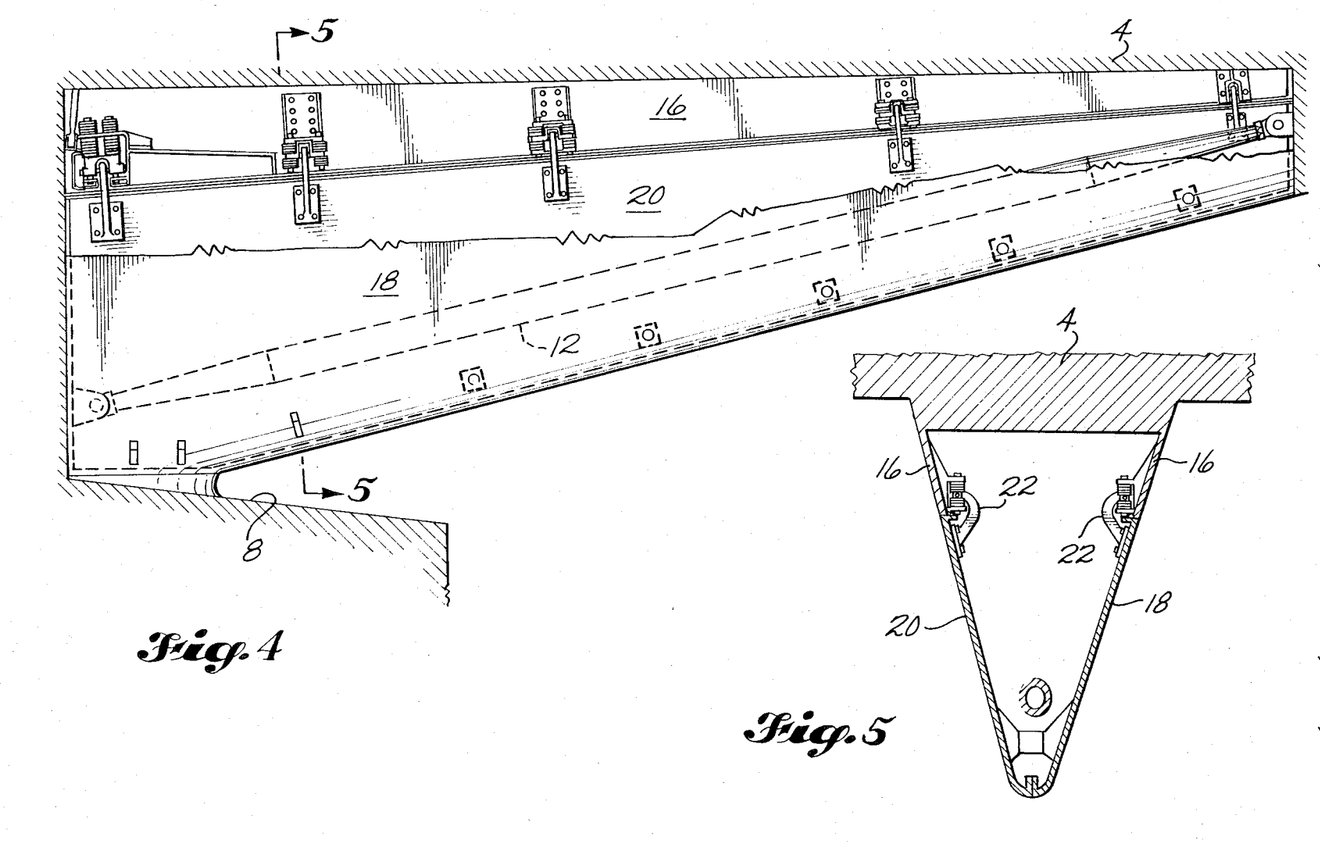
FIG. 4 is an enlarged view of the access door area shown in FIG. 2, with the latching means and the lower portion of the foregoing access door added.
FIG. 5 is a sectional view taken along the line 5—5 in FIG. 4.

FIG. 5 is a simplified vertical sectional view of the access doors 18, 20, taken just forward of the second hinge station looking aft. As is clearly shown in FIG. 5, each fairing has a right access door 20 and a left access door 18 and the two doors converge toward the bottom of the fairing. The latches that hold the bottom ends of the doors closed form no part of the present invention and have been omitted from the drawings except that their locations are schematically indicated in FIG 4. The latches of course can take any of a variety of forms.

Each door 18, 20 has five hinge stations that define a hinge axis along which the door 18, 20 is hingedly attached to the skirt beam 16. Because of the nature of the movement of the engine 8, the movement at the hinge stations is greatest at the forward portion of the doors 18, 20. The movement decreases progressively moving from the forward to the aft end of the door 18, 20. Therefore, the preferred embodiment of the hinge structure is designed to permit the greatest amount of deflection at the forwardmost station and progressively less deflection at the second, third and fourth stations. The deflection at the aftmost or fifth station is sufficiently low so that there is no need to provide for deflection of the hinge axis at that station. In the preferred embodiment of deflections allowed for are in the order of plus or minus 0.45 inches at the first station, plus or minus 0.35 inches at the second station, plus or minus 0.25 inches at the third station, and plus or minus 0.15 inches at the fourth station. These deflections are sufficient to carry the load created by the movement of the engine illustrated in FIG. 3. As can be seen in FIG. 3, the deflection of the engine is lateral and vertical. An important aspect of the present invention is the provision of a hinge structure that will deflect vertically to control the load created by such lateral and vertical movement.

In order to better understand the novel structure of the hinge apparatus at each of the four forward hinge stations, the conventional structure of the apparatus at the fifth or aftmost hinge station will first be described. It should be noted that each door 18, 20 is provided with five hinge stations. The corresponding stations have the same hinge structure and, therefore, it is only necessary to illustrate and describe the stations on one of the doors 18, 20. The drawings illustrate the hinge stations on the right access door 20.

At the fifth hinge station (See FIGS. 14 and 15), a first hinge knuckle 22 is rigidly attached to the access door 20 by means of a mounting plate 26. The knuckle 22 has an arcuate portion that engages a hinge pin 24'. The hinge pin 24' takes the form of a bolt that is received through a hole extending laterally through the bearing head of the knuckle 22. The end of the pin 24 opposite its head is secured by a nut 28. A bifurcated yoke 32 is rigidly mounted on the skirt beam 16 by means of a mounting plate 30. The yoke 32 serves as a carrier or support for the hinge fitting and the two arms of the yoke 32 form second and third knuckles of the hinge apparatus. The knuckle 22 is received between the arms of the yoke 32. Laterally extending holes are provided in the arms of the yoke 32 and are aligned with the lateral hole through the head of the knuckle 22 for receiving the hinge pin 24'. The head of the knuckle 22 has a spherical bearing, known as a monoball, configuration in order to allow some pivotal movement of the knuckle 22 with respect to the yoke 32. As noted above, this pivoting or rocking serves to prevent racking and binding of the hinge apparatus. The conventional arrangement of the fifth hinge station does not allow for translational deflection of the door 20 with respect to the skirt beam 16.

Figures 12, 13, 14, 15:
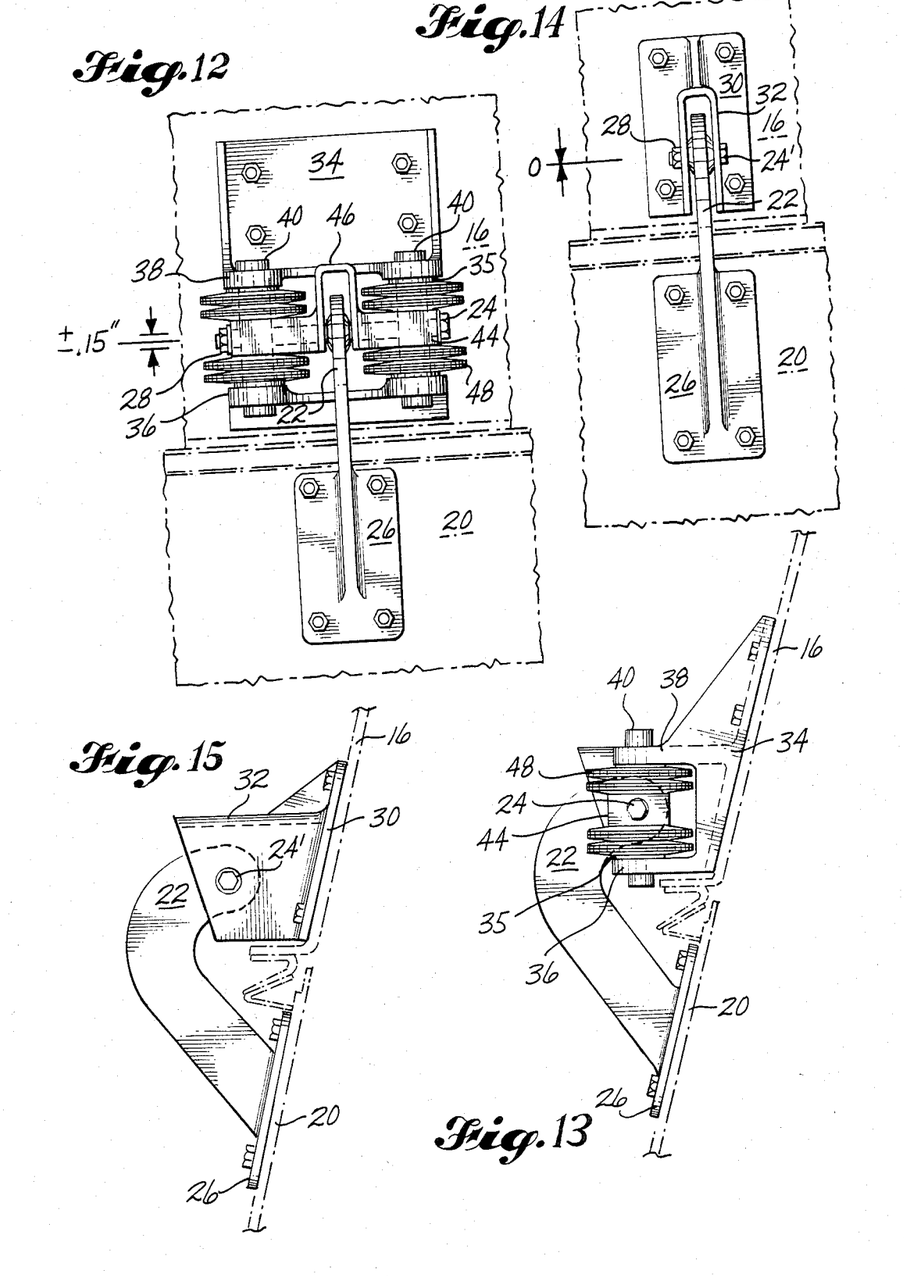
FIG. 12 is a left side elevational view of the fourth hinge station.
FIG. 13 is a rear view of the hinge station shown in FIG. 12.
FIG. 14 is a left side elevational view of the fifth hinge station.
FIG. 15 is a rear view of the hinge station shown in FIG. 14.

Moving forward from the fifth hinge station, FIGS. 12 and 13 show the structure of the fourth hinge station. At this station, the knuckle 22 and associated mounting plate 26 are the same as the corresponding structures at the fifth hinge station. However, the portion of the hinge apparatus mounted on the skirt beam 16 is not conventional but rather is constructed according to the invention to provide for vertical deflection of the hinge axis. Such deflection of the hinge axis allows the door 20 to move with respect to the skirt beam 16 without damaging the hinge apparatus.

At the fourth station, a frame 36, 38 is fixedly mounted on the skirt beam 16 by means of a mounting plate 34. The frame includes a lower member 36 and an upper member 38. Each member 36, 38 has two essentially vertical holes extending therethrough for receiving a rod or shaft 40. In the preferred embodiment, the shaft takes the form of a hollow rod 40. There are two rods 40 at the fourth hinge station, one on either side of the knuckle 22. The longitudinal axes of the rods 40 are vertical to correspond with the direction of controlled movement of the hinge axis. A bearing 35 is staked into each of the four holes in the frame members 36, 38 to provide a bearing surface for sliding movement of the rod 40 with respect to the member 36, 38. The bearings 35 may take any of a variety of known forms and are preferably composed of an aluminum-nickel-bronze alloy machined to form a bearing surface.

At the fourth station, the hinge pin carrier that forms the second and third knuckles of the hinge has a very different stucture from the hinge support at the fifth station. The carrier at the fourth station includes two tubes 44 of rectangular cross section disposed horizontally on either side of the head of the knuckle 22. The tubes 44 are connected by a yoke 46. Each tube 44, together with the adjacent arm of the yoke 46, forms one of the second and third knuckles. The hinge pin 24 is considerably longer than the hinge pin 24' at the fifth station. The hinge pin 24 has the form of a bolt with a head at one end and threads for receiving a nut 28 at the other end. The head of the pin 24 abuts the outer end of one of the tubes 44, and the nut 28 is threaded onto the pin 24 to abut the outer end of the other tube 44. A lateral hole is provided in each sidewall of each of the rods 40 for receiving the pin 24 therethrough. Similarly, the inner ends of the tubes 44 defined by the yoke 46 are provided with lateral holes for receiving the pin 24. In the assembled apparatus, the hinge pin 24 extends, from right to left, through the end wall of the outer end of the right tube 44, the holes provided in the right rod 40, the hole in the right arm of the yoke 46, the hole through the head of the knuckle 22, the hole in the left arm of the yoke, the holes in the left rod 40, and finally a hole provided in the outer end wall of the left tube 44. The hinge pin 24 is secured in place by the nut 28.

Movement of the access door 20 causes a corresponding movement of the knuckle 22 since the knuckle 22 is rigidly mounted on the door 20. This movement is transmitted to the hinge pin 24 by means of the connection between the head of the knuckle 22 and the hinge pin 24. The hinge pin 24, the hinge carrier or support formed by the tubes 44 and yoke 46, and the rods 40 move as a unit with the knuckle 22 and door 20. The only connection between the rigidly mounted frame 36, 38 and the movable structure is the slidable mounting of the rods 40 in the frame members 36, 38. Thus, it is useful to view the resulting structure as comprising a fixed portion including the skirt beam 16 and the frame 36, 38, and a movable portion including the door 20, the knuckle 22, the hinge pin 24, the carrier 44, 46, and the rods 40. The movable portion moves as a unit with respect to the fixed portion.

In the preferred embodiment the rods 40 move with the carrier 44, 46 and may be viewed as part of the carrier 44, 46. Of course, the rods could be fixed to the skirt beam 16 with the carrier 44, 46 and hinge pin 24 sliding along the rods 40. In such case, the rods 40 would be part of the fixed portion rather than the movable portion.

In order to provide for controlled movement of the movable portion of the hinge apparatus with respect to the fixed portion, spring means are provided between the movable and fixed portions. In the preferred embodiment of the hinge structure of the invention, the spring means takes the form of a plurality of stacks of Belleville springs. In the preferred embodiment shown in the drawings, there are four stacks 48 at each hinge station. As is well-known in the art, each stack 48 includes a plurality of frustoconical metal washers. As shown in the drawings, each stack 48 of the preferred embodiment includes a plurality of groups of these frusto-conical washers. Each group includes four washers arranged as shown in the drawings. At the fourth hinge station, each stack 48 has two such groups of washers and therefore has eight washers. These stacks 48 are arranged as shown in the drawings with two stacks 48 associated with each of the rods 40. These stacks are positioned around the rod 40 and on either side of the tube 44 of the carrier 44, 46. On each rod 40, there is one stack 48 of springs positioned between the lower frame member 36 and the tube 44 and another stack positioned between the upper frame member 38 and the tube 44.

In operation, vertical movement of the door 20 is transmitted to the hinge pin 24 by the attachment of hinge knuckle 22 to pin 24. The movement of the hinge pin 24 is in turn transmitted to the carrier 44, 46 and the rods 40 by the abutment of the pin 24 against the inner walls of the laterally extending holes that receive the pin 24. When the door 20 moves upwardly, the spring stacks between the upper frame member 38 and the tubes 44 are compressed. When the door 20 moves downwardly, the stacks between the tubes 44 and the lower frame member 36 are compressed. The spring stacks are each provided with a preload so that when the upper or lower stacks 48 are compressed, the uncompressed lower or upper stacks 48 are permitted to relax. The amount of preload is preferably not very great and is in the order of 0.020 inches. If the movement of the door 20 is greaer than this preload, the uncompressed stacks first relax to an unstressed condition and then remain at rest as the other springs are further compressed.

Figures 10, 11, 16:
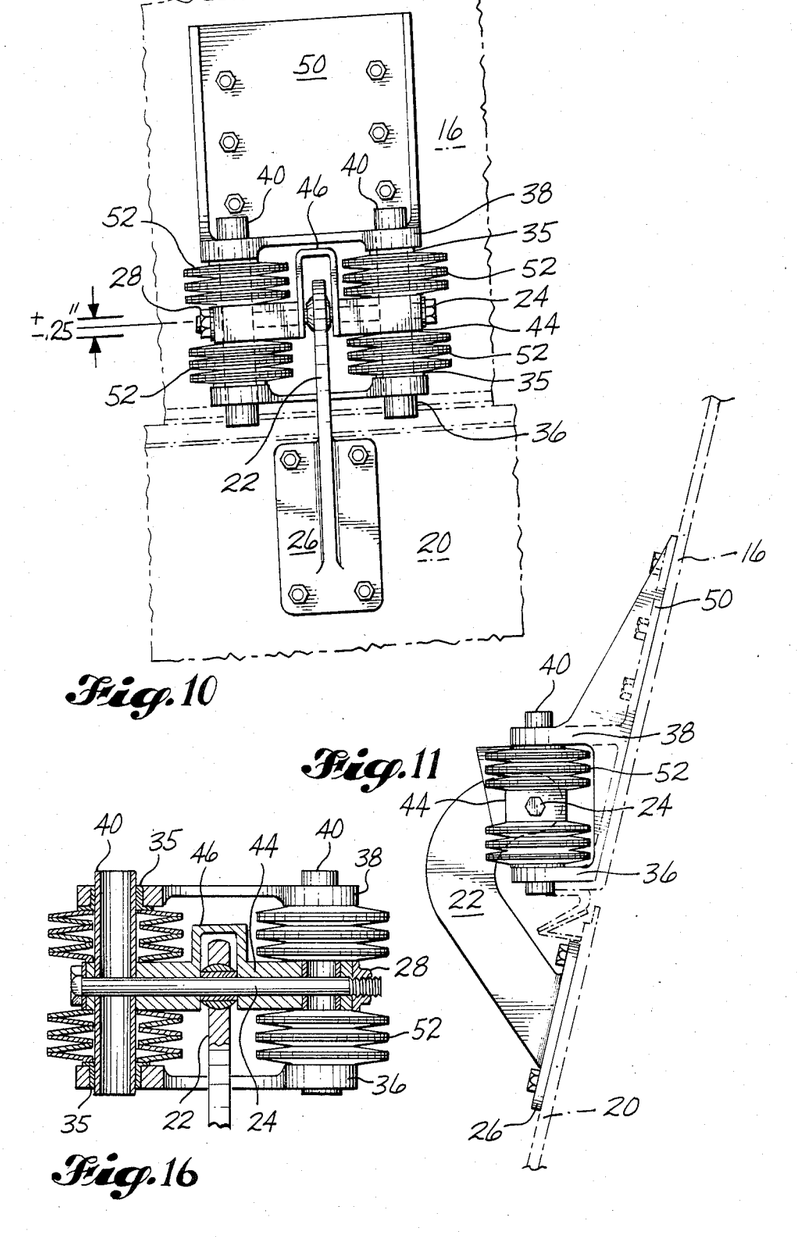
FIG. 10 is a left side elevational view of the third hinge station.
FIG. 11 is a rear view of the hinge station shown in FIG. 10.
FIG. 16 is a left side elevational view of the carrier and hinge pin shown in FIG. 10, with parts shown in section.

The four stack arrangement of the Belleville springs permits controlled deflection along the vertical in either the upward or the downward direction. It also provides for biasing the hinge pin 24 in a center vertical position. The four stack arrangement provides a balanced movement of the hinge axis and provides the required amount of movement of the hinge axis at each station while cushioning the hinge apparatus from the load created by the movement of the door 20. At each hinge station, the compression of the springs on either side of the knuckle 22 is essentially identical, but the hinge structure of the invention provides for differential compression and vertical movement from station to station. The magnitude of the differential is discussed above. Moving forward from the fourth hinge station, the third hinge station has a structure very much like the structure of the apparatus at the fourth station. (See FIGS. 10 and 11.) The major differences are that the mounting plate 50 attached to the skirt beam 16 is larger than the mounting plate 34 at the fourth station, there are three groups of frusto-conical washers in each stack 52 of Belleville springs, and the rods 40 are sufficiently longer and the frame members 36, 38 are sufficiently farther apart to accommodate the additional springs. These differences in structure serve to permit greater deflection of the hinge axis at the third station than at the fourth station.

Figures 8, 9, 17:
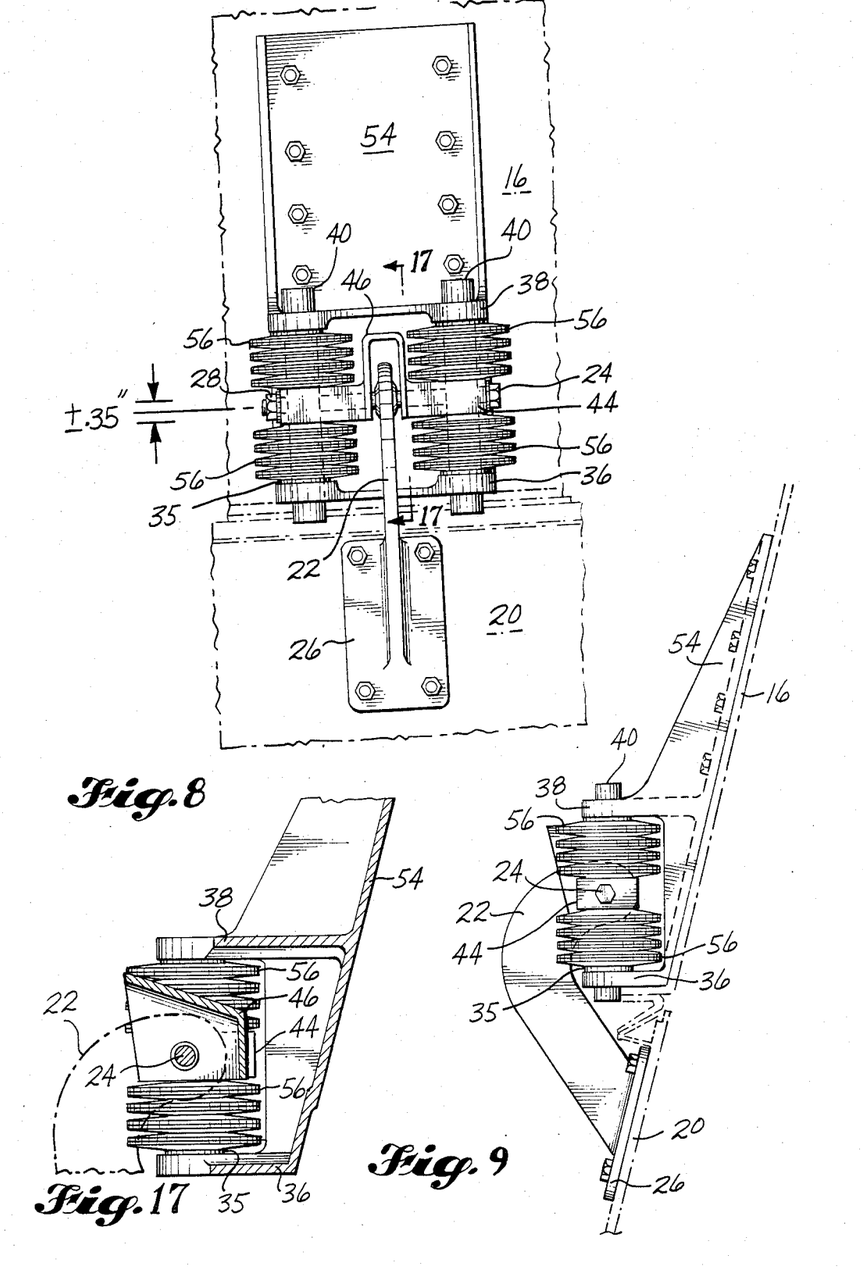
FIG. 8 is a left side elevational view of the second hinge station.
FIG. 9 is a rear view of the hinge station shown in FIG. 8.
FIG. 17 is a vertical sectional view taken along the line 17—17 in FIG. 8.

The second hinge station shown in FIGS. 8 and 9 is similar to both the third and the fourth hinge stations. The differences between the second and third stations correspond to the differences between the third and fourth stations. Again the major differences are that the mounting plate 54 attached to the skirt beam 16 is larger, an additional group of Belleville springs is provided in each stack 56, and the rods 40 and frame 36, 38 are dimensioned to accommodate the additional springs. Again, the differences in structure provide for greater deflection of the hinge axis at the second station.

Figure 6:
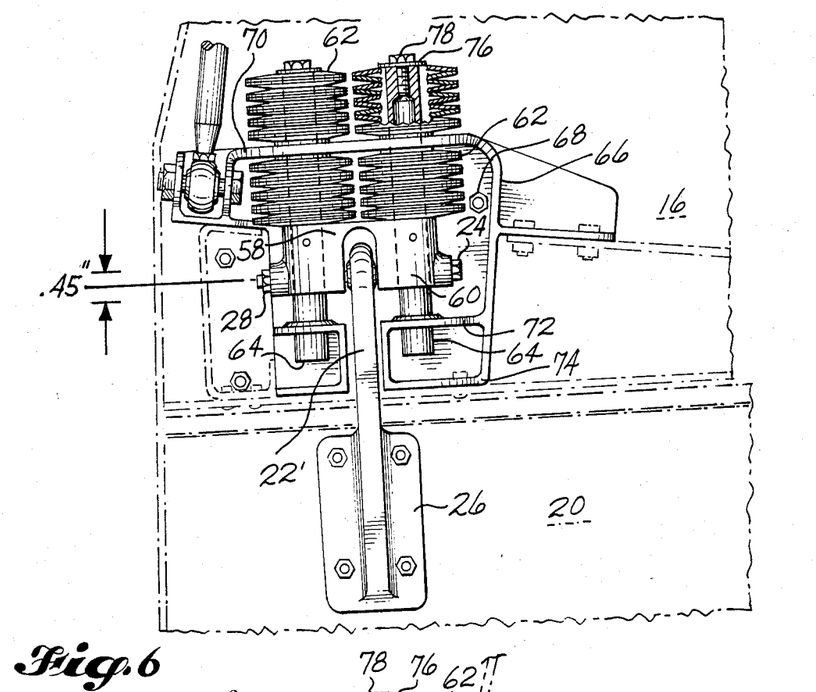
FIG. 6 is a left side elevational view of the forwardmost or first hinge station.
Figure 7:
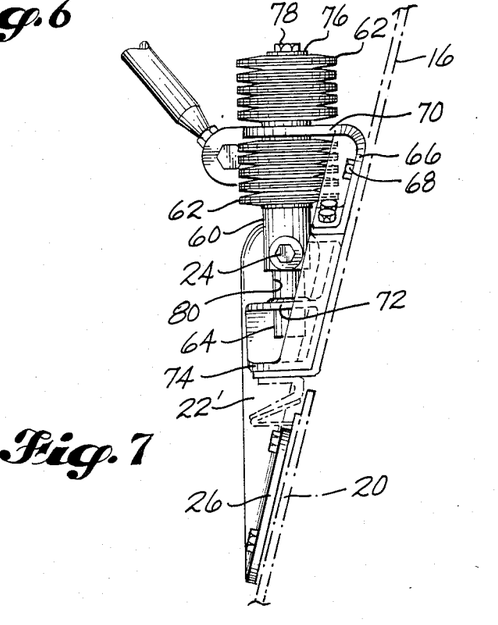
FIG. 7 is a rear view of the hinge station shown in FIG. 6.

Referring to FIGS. 6 and 7, it can be seen that the structure of the hinge apparatus at the first hinge station is different from the structure at the second, third and fourth stations. At the first station, the hinge pin carrier 58, 60 is positioned below all four stacks 62 of Belleville springs. In place of the tubes 44 at the sides of the yoke 46 at the other stations, the sides 60 of the yoke 58 at the first station extend the full vertical length of the yoke. Sides 60 form the second and third knuckles of the hinge. As can be seen in FIG. 7, the vertical cross-sectional shape of the side 60 of the yoke 58 is rectangular. The connections between the hinge pin 24 and the yoke 58 and the rods 64 are essentially the same as the corresponding connections between the hinge pin 24 and the carrier 44, 46 and the rods 40 at the other stations.

At the first station, a mounting frame 66 is bolted to the skirt beam 16 by bolts 68. The frame 66 has three inwardly projecting portions 70, 72, 74. The two lower projections, 72, 74 are bifurcated to allow a vertical passageway for the hinge knuckle 22' rigidly attached to the door 20. These lower two projections 72, 74 are connected at their inner ends adjacent to the passageway by vertical frame members. Each of the two portions of projection 72 has a vertical hole extending therethrough for slidably mounting the rods 64. The upper projection 70 is similarly provided with two vertical holes for slidably receiving the two rods 64. As at the other stations, a bearing is staked into the frame at each vertical hole to provide a bearing surface for the rods 64 to slide along. The bearings are preferably of the same construction as those at the other stations and are made from an aluminum nickel bronze alloy with a machined bearing surface. At the first station, each of the rods 64 is provided at its upper end with a washer that forms a spring abutment 76 threadedly secured to the rod 64 by a bolt 78. This additional spring abutment 76 is necessary since the upper stacks 62 of Belleville springs do not abut the carrier yoke 58.

The operation of the apparatus at the first station is in principle the same as the operation of the apparatus at the other hinge stations. When the door 20 is moved vertically downwardly, the movable portion of the stucture (the door 20, the hinge knuckle 22', the hinge pin 24, the yoke 58, and the rods 64) moves downwardly as a unit. This compresses the two upper stacks 62 of springs and allows the lower stacks to relax. When the movable portion of the apparatus moves upwardly, the lower stacks 62 of springs are compressed and the upper stacks are allowed to relax. The movement is transmitted in essentially the same manner as the movement at the second, third, and fourth stations. The lower stacks 62 are compressed between the upper frame projection 70 and the yoke 58. The upper stacks are compressed between the upper frame projection 70 and the spring abutments 76. The amount of vertical movement provided for is greatest at this first hinge station. Each stack 62 of Belleville springs includes five groups of four washers arranged in the same manner as the groups of washers in the other hinge locations, as shown in the drawings.

The hinge knuckle 22' rigidly attached to the door 20 at the first hinge station is functionally identical to the hinge knuckle 22 associated with stations 2, 3, and 4. However, knuckle 22' is structured somewhat differently from knuckles 22. Knuckle 22', rather than being arcuate, is essentially straight with a cutout 80 to provide clearance for the hinge pin 24. This difference between the hinge apparatus at station one and the apparatus at stations 2-4 is provided primarily because of especially severe space limitations at the first station. Similarly, the differences in the arrangement of the Belleville springs and the carrier for the hinge pin 24 are largely due to greater space limitations in combination with the nedd to provide a larger number of Belleville springs to accommodate the greater amount of vertical deflection at the forward end of the door 20.

Throughout the description of the structure and operation of the preferred embodiment of the hinge structure of this invention, the terms "vertical", "upwardly", "downwardly", and the like have been used. These terms have been used for illustrative purposes only, illustrating a typical use attitude of the hinge structure of the invention. The terms are not intended to indicate that the use attitude of the hinge structure of the invention is limited to a vertical position, and it is intended to be understood that the hinge structure of this invention can be used to advantage in other use attitudes. For example, the hinge structure might be used to permit relative horizontal movement between two stuctural members that are oriented horizontally rather than vertically with respect to each other.

It will obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. For use in a system in which a hinge knuckle is rigidly mounted on a first structure and a hinge pin having a longitudinal axis is carried by a second structure for pivotally engaging the hinge knuckle with the knuckle being pivotable about said axis, means for allowing controlled translational movement of one of said structures relative to the other of said structures to prevent excessive hinge loads, comprising:

a hinge pin carrier to which the hinge pin is attached;

mounting means for slidably mounting the carrier onto the second structure to allow movement of the carrier relative to the second structure in either direction along a line essentially perpendicular to the longitudinal axis of the hinge pin; and spring means positioned between a portion of the second structure and a portion of the carrier for controlling said movement of the carrier and for biasing the carrier into an intermediate set position;

wherein the first structure, hinge knuckle, hinge pin, and carrier move as a unit with respect to the second structure when one of said structures is subjected to a load tending to move it along said line; and wherein the spring means is positioned to be compressed by movement of the carrier relative to the second structure, caused by such a load on one of said structures, away from said intermediate set position in either direction along said line, and to return the carrier to said intermediate set position upon removal of said load.

2. Means for allowing controlled translational movement as described in claim 1, in which the spring means comprises a plurality of Belleville springs.

3. Means for allowing controlled translational movement as described in claim 1, in which the spring means comprises at least first and second stacks of Belleville springs; wherein movement of the carrier in one direction along said line compresses the first but not the second stack, and movement of the carrier in the opposite direction compresses the second but not the first stack.

4. Means for allowing controlled translational movement as described in claim 3, in which the mounting means comprises a shaft that extends through said first and second stacks of Belleville springs.

5. Means for allowing controlled translational movement as described in claim 4, in which the shaft is fixed to the carrier and forms a part of the carrier, and generally opposite end portions of said shaft are slidably mounted on said second structure.

6. Means for allowing controlled translational movement as described in claim 1, in which said knuckle forms a first hinge knuckle, and portions of the carrier form second and third hinge knuckles and a space therebetween into which the first hinge knuckle projects, said second and third knuckles being attached to opposite end portions of the hinge pin.

7. Means for allowing controlled translational movement as described in claim 6, in which the spring means comprises first, second, third, and fourth stacks of Belleville springs, said first and second stacks being substantially aligned with said second knuckle, and said third and fourth stacks being substantially aligned with said third knuckle; wherein movement of the carrier in one direction along said line compresses the first and third but not the second and fourth stacks, and movement of the carrier in the opposite direction compresses the second and fourth but not the first and third stacks.

8. Means for allowing controlled translational movement as described in claim 7, in which the mounting means comprises two parallel shafts, one of which extends through said first and second stacks of Belleville springs, and the other of which extends through said third and fourth stacks of Belleville springs.

9. Means for allowing controlled translational movement as described in claim 1, in which said knuckle forms a first hinge knuckle, and portions of the carrier form second and third hinge knuckles and a space therebetween into which the first hinge knuckle projects, said second and third knuckles being attached to opposite end portions of the hinge pin; in which the spring means comprises two opposite side portions, one of which is substantially aligned with said second knuckle, and the other of which is substantially aligned with said third knuckle; and in which the mounting means comprises two parallel shafts, one of which extends through said one side portion and is fixed to one of said second knuckle and said second structure and slidably mounted on the other of said second knuckle and said second structure, and the other of which extends through said other side portion and is fixed to one of said third knuckle and said second structure and slidably mounted on the other side third knuckle and said second structure.

10. Means for allowing controlled translational movement as described in claim 9, in which said one side portion comprises first and second spring portions, and said other side portion comprises third and fourth spring portions; and in which movement of the carrier in one direction along said line compresses the first and third but not the second and fourth portions, and movement of the carrier in the opposite direction compresses the second and fourth but not the first and third portions.

11. Means for allowing controlled translational movement as described in claim 9, in which said one side portion comprises first and second stacks of Belleville springs, and said other side portion comprises third and fourth stacks of Belleville springs; and in which movement of the carrier in one direction along said line compresses the first and third but not the second and fourth stacks, and movement of the carrier in the opposite direction compresses the second and fourth but not the first and third stacks.

12. For use in a system in which a hinge knuckle is rigidly mounted on a first structure and a hinge pin having a longitudinal axis is carried by a second structure for pivotally engaging the hinge knuckle with the knuckle being pivotable about said axis, means for allowing controlled translational movement of one of said structures relative to the other of said structures to prevent excessive hinge loads, comprising:

a hinge pin carrier to which the hinge pin is attached;
mounting means for slidably mounting the carrier onto the second structure to allow movement of the carrier relative to the second structure in either direction along a line essentially perpendicular to the longitudinal axis of the hinge pin; and
spring means positioned between a portion of the second structure and a portion of the carrier for controlling said movement of the carrier and for biasing the carrier into a set position;
wherein the first structure, hinge knuckle, hinge pin, and carrier move as a unit with respect to the second structure when one of said structures is subjected to a load tending to move it along said line;
wherein said knuckle forms a first hinge knuckle, and portions of the carrier form second and third hinge knuckles and a space therebetween into which the first hinge knuckle projects, said second and third knuckles being attached to opposite end portions of the hinge pin;
wherein the spring means comprises first, second, third, and fourth stacks of Belleville springs, said first and second stacks being substantially aligned with said second knuckle, and said third and fourth stacks being substantially aligned with said third knuckle; and movement of the carrier in one direction along said line compresses the first and third but not the second and fourth stacks, and movement of the carrier in the opposite direction compresses the second and fourth but not the first and third stacks;
wherein the mounting means comprises two parallel shafts, one of which extends through said first and second stacks of Belleville springs, and the other of which extends through said third and fourth stacks of Belleville springs; and
wherein said one shaft is fixed to said second knuckle, said other shaft is fixed to said third knuckle, generally opposite end portions of each shaft are slidably mounted on said second structure, and said shafts form a part of the carrier.

13. Means for allowing controlled translational movement as described in claim 12, in which said second knuckle is positioned between said first and second stacks, and said third knuckle is positioned between said third and fourth stacks.

14. Means for allowing controlled translational movement as described in claim 12, in which said first and third stacks are positioned adjacent to said second and third knuckles, respectively, and on one side of a spring abutment formed by said portion of the second structure; and said second and fourth stacks are positioned on the opposite side of said abutment and between said abutment and spring abutments carried by said shafts.

15. For use in an aircraft in which a first structure is hingedly connected to a second structure by the pivotal attachment of a hinge knuckle to a hinge pin having a longitudinal axis, said hinge knuckle being rigidly attached to said first structure and being pivotable about said axis, means for allowing controlled translational movement of one of said structures relative to the other of said structures to prevent excessive hinge loads, comprising:

a hinge pin carrier to which the hinge pin is attached;
mounting means for slidably mounting the carrier onto the second structure to allow movement of the carrier relative to the second structure in either direction along a line essentially perpendicular to the longitudinal axis of the hinge pin; and
spring means positioned between a portion of the second structure and a portion of the carrier for controlling said movement of the carrier and for biasing the carrier into an intermediate set position;
wherein the first structure, hinge knuckle, hinge pin, and carrier move as a unit with respect to the second structure when one of said structures is subjected to a load tending to move it along said line; and
wherein the spring means is positioned to be compressed by movement of the carrier relative to the second structure, caused by such a load on one of said structures, away from said intermediate set position in either direction along said line, and to return the carrier to said intermediate set position upon removal of said load.

16. Means for allowing controlled translational movement as described in claim 15, in which the spring means comprises a plurality of Belleville springs.

17. Means for allowing controlled translational movement as described in claim 15, in which the spring means comprises at least first and second stacks of Belleville springs; wherein movement of the carrier in one direction along said line compresses the first but not the second stack, and movement of the carrier in the opposite direction compresses the second but not the first stack.

18. Means for allowing controlled translational movement as described in claim 17, in which the mounting means comprises a shaft that extends through said first and second stacks of Belleville springs.

19. Means for allowing controlled translational movement as described in claim 18, in which the shaft is fixed to the carrier and forms a part of the carrier, and generally opposite end portions of said shaft are slidably mounted on said second structure.

20. Means for allowing controlled translational movement as described in claim 15, in which said knuckle forms a first hinge knuckle, and portions of the carrier form second and third hinge knuckles and a space therebetween into which the first hinge knuckle projects, said second and third knuckles being attached to opposite end portions of the hinge pin.

21. Means for allowing controlled translational movement as described in claim 20, in which the spring means comprises first, second, third, and fourth stacks of Belleville springs, said first and second stacks being substantially aligned with said second knuckle, and said third and fourth stacks being substantially aligned with said third knuckle; wherein movement of the carrier in one direction along said line compresses the first and third but not the second and fouth stacks, and movement of the carrier in the opposite direction compresses the second and fourth stacks but not the first and third stacks.

22. Means for allowing controlled translational movement as described in claim 21, in which the mounting means comprises two parallel shafts, one of which extends through said first and second stacks of Belleville springs, and the other of which extends through said third and fourth stacks of Belleville springs.

23. Means for allowing controlled translational movement as described in claim 15, in which said knuckle forms a first hinge knuckle, and portions of the carrier form second and third hinge knuckles and a space therebetween into which the first hinge knuckle projects, said second and third knuckles being attached to opposite end portions of the hinge pin; in which the spring means comprises two opposite side portions, one of which is substantially aligned with said second knuckle, and the other of which is substantially aligned with said third knuckle; and in which the mounting means comprises two parallel shafts, one of which extends through said one side portion and is fixed to one of said second knuckle and said second structure and slidably mounted on the other of said second knuckle and said second structure, and the other of which extends through said other side portion and is fixed to one of said third knuckle and said second structure and slidably mounted on the other of said third knuckle and said second structure.

24. Means for allowing controlled translational movement as described in claim 23, in which said one side portion comprises first and second spring portions, and said other side portion comprises third and foruth spring portions; and in which movement of the carrier in one direction along said line compresses the first and third but not the second and fourth portions, and movement of the carrier in the opposite direction compresses the second and fourth but not the first and third portions.

25. Means for allowing controlled translational movement as described in claim 23, in which said one side portion comprises first and second stacks of Belleville springs, and said other side portion comprises third and fourth stacks of Belleville springs; and in which movement of the carrier in one direction along said line compresses the first and third but not the second and fourth stacks, and movement of the carrier in the opposite direction compresses the second and fourth but not the first and third stacks.

26. For use in an aircraft in which a first structure is hingedly connected to a second structure by the pivotal attachment of a hinge knuckle to a hinge pin having a longitudinal axis, said hinge knuckle being rigidly attached to said first structure and being pivotable about said axis, means for allowing controlled translational movement of one of said structures relative to the other of said structures to prevent excessive hinge loads, comprising:
a hinge pin carrier to which the hinge pin is attached;
mounting means for slidably mounting the carrier onto the second structure to allow movement of the carrier relative to the second structure in either direction along a line essentially perpendicular to the longitudinal axis of the hinge pin; and
spring means positioned between a portion of the second structure and a portion of the carrier for controlling said movement of the carrier and for biasing the carrier into a set position;
wherein the first structure, hinge knuckle, hinge pin, and carrier move as a unit with respect to the second structure when one of said structures is subjected to a load tending to move it along said line;
wherein said knuckle forms a first hinge knuckle, and portions of the carrier form second and third hinge knuckles and a space therebetween into which the first hinge knuckle projects, said second and third knuckles being attached to opposite end portions of the hinge pin;
wherein the spring means comprises first, second, third, and fourth stacks of Belleville springs, said first and second stacks being substantially aligned with said second knuckle, and said third and fourth stacks being substantially aligned with said third knuckle; and movement of the carrier in one direction along said line compresses the first and third but not the second and fourth stacks, and movement of the carrier in the opposite direction compresses the second and fourth but not the first and third stacks;
wherein the mounting means comprises two parallel shafts, one of which extends through said first and second stacks of Belleville springs, and the other of which extends through said third and fourth stacks of Belleville springs; and
wherein said one shaft is fixed to said second knuckle, said other shaft is fixed to said third knuckle, generally opposite end portions of each shaft are slidably mounted on said second structure, and said shafts form a part of the carrier.

27. Means for allowing controlled translational movement as described in claim 26, in which said second knuckle is positioned between said first and second stacks, and said third knuckle is positioned between said third and fourth stacks.

28. Means for allowing controlled translational movement as described in claim 26, in which said first and third stacks are positioned adjacent to said second and third knuckles, respectively, and on one side of a spring abutment formed by said portion of the second structure; and said second and fourth stacks are positioned on the opposite side of said abutment and between said abutment and spring abutments carried by said shafts.

29. For use in an aircraft in which a first structure is hingedly connected to a second structure along a hinge connection by the pivotal attachment of a plurality of hinge knuckles to a plurality of spaced apart hinge pins, each of said pins having a longitudinal axis, said hinge knuckles being rigidly attached to said first structure, and each of said knuckles being pivotable about said axis of a corresponding pin, means for allowing controlled translational movement of one of said structures relative to the other of said structures to prevent excessive hinge loads, comprising:
a plurality of hinge pin carriers to each of which one of the hinge pins is attached;
mounting means for slidably mounting each carrier onto the second structure to allow movement of the carrier relative to the second structure in either direction along a line essentially perpendicular to the longitudinal axis of the corresponding hinge pin; and
spring means positioned between a portion of the second structure and a portion of each carrier for controlling said movement of the carrier and for biasing the carrier into an intermediate set position;

wherein the first structure, hinge knuckles, hinge pins, and carriers move as a unit with respect to the second structure when one of said structures is subjected to a load tending to move it along said line;

wherein each spring means is positioned to be compressed by movement of the corresponding carrier relative to the second structure, caused by such a load on one of said structures, away from said intermediate set position in either direction along said line, and to return such corresponding carrier to said intermediate set position upon removal of said load; and wherein, from one end of the hinge connection to its opposite end, adjacent spring means allow increasing amounts of movement.

30. Means for allowing controlled translational movement as described in claim 29, in which each spring means comprises a plurality of Belleville springs, and said increasing amounts of movement correspond to increasing numbers of Belleville springs.

31. Means for allowing controlled translational movement as described in claim 29, in which each of said knuckles forms a first hinge knuckle, and portions of the corresponding carrier form second and third hinge knuckles and a space therebetween into which the first hinge knuckle projects, said second and third knuckles being attached to opposite end portions of the corresponding hinge pin; in which each spring means comprises two opposite side portions, one of which is substantially aligned with said second knuckle, and the other of which is substantially aligned with said third knuckle; and in which each mounting means comprises two parallel shafts, one of which extends through said one side portion and is fixed to one of said second knuckle and said second structure and slidably mounted on the other of said second knuckle and said second structure, and the other of which extends through said other side portion and is fixed to one of said third knuckle and said second structure and slidably mounted on the other of said third knuckle and said second structure.

32. Means for allowing controlled translational movement as described in claim 31, in which said one side portion comprises first and second spring portions, and said other side portion comprises third and fourth spring portions; and in which movement of the carrier in one direction along said line compresses the first and third but not the second and fourth portions, and movement of the carrier in the opposite direction compresses the second and fourth but not the first and third portions.

33. Means for allowing controlled translational movement as described in claim 31, in which said one side portion comprises first and second stacks of Belleville springs, and said other side portion comprises third and fourth stacks of Belleville springs; and in which movement of the carrier in one direction along said line compresses the first and third but not the second and fourth stacks, and movement of the carrier in the opposite direction compresses the second and fourth but not the first and third stacks.

34. For use in a system in which a hinge knuckle is rigidly mounted on a first structure and a hinge pin having a longitudinal axis is carried by a second structure for pivotally engaging the hinge knuckle with the knuckle being pivotable about said axis, means for allowing controlled translational movement of one of said structures relative to the other of said structures to prevent excessive hinge loads, comprising:

a hinge pin carrier to which the hinge pin is attached;

mounting means for slidably mounting the carrier onto the second structure to allow movement of the carrier relative to the second structure in either direction along a line essentially perpendicular to the longitudinal axis of the hinge pin; and spring means positioned between a portion of the second structure and a portion of the carrier for controlling said movement of the carrier and for biasing the carrier into a set position;

wherein the first structure, hinge knuckle, hinge pin, and carrier move as a unit with respect to the second structure when one of said structures is subjected to a load tending to move it along said line;

wherein said knuckle forms a first knuckle, and portions of the carrier form second and third hinge knuckles and a space therebetween into which the first hinge knuckle projects, said second and third knuckles being attached to opposite end portions of the hinge pin;

wherein the spring means comprises first, second, third, and fourth stacks of Belleville springs, said first and second stacks being substantially aligned with said second knuckle, and said third and fourth stacks being substantially aligned with said third knuckle; and movement of the carrier in one direction along said line compresses the first and third but not the second and fourth stacks, and movement of the carrier in the opposite direction compresses the second and fourth but not the first and third stacks;

wherein the mounting means comprises two parallel shafts, one of which extends through said first and second stacks of Belleville springs, and the other of which extends through said third and fourth stacks of Belleville springs; and wherein said one shaft is fixed to one of said second knuckle and said second structure, and slidably mounted on the other of said second knuckle and said second structure; and said other shaft is fixed to one of said third knuckle and said second structure, and slidable mounted on the other of said third knuckle and said second structure.

35. Means for allowing controlled translational movement as described in claim 34, in which said second knuckle is positioned between said first and second stacks, and said third knuckle is positioned between said third and fourth stacks.

36. Means for allowing controlled translational movement as described in claim 34, in which said first and third stacks are positioned adjacent to said second and third knuckles, respectively, and on one side of a spring abutment formed by said portion of the second structure; and said second and fourth stacks are positioned on the opposite side of said abutment and between said abutment and spring abutments carried by said shafts.

37. For use in an aircraft in which a first structure is hingedly connected to a second structure by the pivotal attachment of a hinge knuckle to a hinge pin having a longitudinal axis, said hinge knuckle being rigidly attached to said first structure and being pivotable about said axis, means for allowing controlled translational movement of one of said structures relative to the other of said structures to prevent excessive hinge loads, comprising:

a hinge pin carrier to which the hinge pin is attached;

mounting means for slidably mounting the carrier onto the second structure to allow movement of the carrier relative to the second structure in either direction along a line essentially perpendicular to the longitudinal axis of the hinge pin; and spring means positioned between a portion of the second structure and a portion of the carrier for controlling said movement of the carrier and for biasing the carrier into a set position;

wherein the first structure, hinge knuckle, hinge pin, and carrier move as a unit with respect to the second structure when one of said structures is subjected to a load tending to move it along said line;

wherein said knuckle forms a first hinge knuckle, and portions of the carrier form second and third hinge knuckles and a space therebetween into which the first hinge knuckles projects, said second and third knuckles being attached to opposite end portions of the hinge pin;

wherein the spring means comprises first, second, third, and fourth stacks of Belleville springs, said first and second stacks being substantially aligned with said second knuckle, and said third and fourth stacks being substantially aligned with said third knuckle; and movement of the carrier in one direction along said line compresses the first and third but not the second and fourth stacks, and movement of the carrier in the opposite direction compresses the second and fourth but not the first and third stacks;

wherein the mounting means comprises two parallel shafts, one of which extends through said first and second stacks of Belleville springs, and the other of which extends through said third and fourth stacks of Belleville springs; and wherein said one shaft is fixed to one of said second knuckle and said second structure, and slidably mounted on the other of said second knuckle and said second structure; and said other shaft is fixed to one of said third knuckle and said second structure, and slidable mounted on the other of said third knuckle and said second structure.

38. Means for allowing controlled translational movement as described in claim 37, in which said second knuckle is positioned between said first and second stacks, and said third knuckle is positioned between said third and fourth stacks.

39. Means for allowing controlled translational movement as described in claim 37, in which said first and third stacks are positioned adjacent to said second and third knuckles, respectively, and on one side of a spring abutment formed by said portion of the second structure; and said second and fourth stacks are positioned on the opposite side of said abutment and between said abutment and spring abutments carried by said shafts.

* * * * *

UNITED STATES PATENT AND TRADEMARK OFFICE
CERTIFICATE OF CORRECTION

PATENT NO. : 4,524,485
DATED : June 25, 1985
INVENTOR(S) : Alfred W. Harris It is certified that error appears in the above-identified patent and that said Letters Patent are hereby corrected as shown below:

```
Column 1, 5th line of 3rd full paragraph,  "located"
    should be  -- latched --.
Column 2, line 3,   "Feb. 4"   should be  -- Feb. 5 --.
Column 2, line 43,  "Widley"   should be  -- Wildey --.
Column 3, line 36,  "fouth"    should be  -- fourth --.
Column 5, line 21,  "foregoing" should be -- foreground
    --.
Column 9, line 20,  "greaer"   should be  -- greater --.
Column 10, line 68, "nedd"     should be  -- need --.
Column 12, line 52, "side"     should be  -- of said --.
Column 14, line 68, "fouth"    should be  -- fourth --.
Column 18, line 17, following "first", insert -- hinge --.
```

Signed and Sealed this

Seventeenth Day of June 1986

[SEAL]

*Attest:*

DONALD J. QUIGG

*Attesting Officer*   *Commissioner of Patents and Trademarks*